US006416869B1

(12) United States Patent
van Ooij et al.

(10) Patent No.: US 6,416,869 B1
(45) Date of Patent: Jul. 9, 2002

(54) SILANE COATINGS FOR BONDING RUBBER TO METALS

(75) Inventors: Wim J. van Ooij, Fairfield; Senthil K. Jayaseelan, Cincinnati; Eric A. Mee, Goshen, all of OH (US)

(73) Assignee: University of Cincinnati, Cincinnati, OH (US)

( * ) Notice: Subject to any disclaimer, the term of this patent is extended or adjusted under 35 U.S.C. 154(b) by 0 days.

(21) Appl. No.: 09/356,912

(22) Filed: Jul. 19, 1999

(51) Int. Cl.[7] .............................................. B32B 15/08

(52) U.S. Cl. .................. 428/450; 427/387; 428/450; 428/447; 528/30; 528/38; 556/427; 556/413

(58) Field of Search ................................. 428/447, 450; 427/387; 528/30, 38; 556/427, 413

(56) References Cited

U.S. PATENT DOCUMENTS

| | | |
|---|---|---|
| 2,751,314 A | 6/1956 | Keil |
| 3,022,196 A | 2/1962 | Jenkins et al. |
| 3,246,671 A | 4/1966 | Stein et al. |
| 3,476,826 A | 11/1969 | Millen |
| 3,816,152 A | 6/1974 | Yates |
| 3,873,334 A | 3/1975 | Lee et al. |
| 3,879,206 A | 4/1975 | Nestler et al. |
| 3,960,800 A | 6/1976 | Kohl, Jr. |
| 4,000,347 A | 12/1976 | Ranney et al. |
| 4,015,044 A | 3/1977 | Ranney et al. |
| 4,059,473 A | 11/1977 | Okami |
| 4,064,313 A | 12/1977 | Takiguchi et al. |
| 4,151,157 A | 4/1979 | Williams et al. |
| 4,152,347 A | 5/1979 | Pletka et al. |
| 4,179,537 A | 12/1979 | Rykowski |
| 4,210,459 A | 7/1980 | Williams et al. |
| 4,231,910 A | 11/1980 | Plueddemann |
| 4,243,718 A | 1/1981 | Murai et al. |
| 4,315,970 A | 2/1982 | McGee |
| 4,401,500 A | 8/1983 | Hamada et al. |
| 4,409,266 A | 10/1983 | Wieczorrek et al. |
| 4,441,946 A | 4/1984 | Sharma |
| 4,457,970 A | 7/1984 | Das et al. |
| 4,461,867 A | 7/1984 | Surprenant |
| 4,489,191 A | 12/1984 | Chung |
| 4,534,815 A | 8/1985 | Hamada et al. |
| 4,618,389 A | 10/1986 | Agodoa |
| 4,681,636 A | 7/1987 | Saito et al. |
| 4,719,262 A | 1/1988 | Plueddemann |
| 4,863,794 A | 9/1989 | Fujii et al. |
| 5,051,129 A | 9/1991 | Cuthbert et al. |
| 5,073,195 A | 12/1991 | Cuthbert et al. |
| 5,073,456 A | 12/1991 | Palladino |
| 5,108,793 A | 4/1992 | van Ooij et al. |
| 5,217,751 A | 6/1993 | King et al. |
| 5,221,371 A | 6/1993 | Miller |
| 5,292,549 A | 3/1994 | van Ooij et al. |
| 5,322,713 A | 6/1994 | van Ooij et al. |
| RE34,675 E | 7/1994 | Plueddemann |
| 5,326,594 A | 7/1994 | Sabata et al. |
| 5,363,994 A | 11/1994 | Angeline |
| 5,389,405 A | 2/1995 | Purnell et al. |
| 5,393,353 A | 2/1995 | Bishop |
| 5,405,985 A | 4/1995 | Parker et al. |
| 5,412,011 A | 5/1995 | Morris et al. |
| 5,433,976 A | 7/1995 | van Ooij et al. |
| 5,455,080 A | 10/1995 | van Ooij et al. |
| 5,466,848 A | 11/1995 | Childress |
| 5,468,893 A | 11/1995 | Parker et al. |
| 5,520,768 A | 5/1996 | Crook et al. |
| 5,603,818 A | 2/1997 | Brent et al. |
| 5,622,782 A | 4/1997 | Poutasse, III et al. |
| 5,633,038 A | 5/1997 | Ruschau |
| 5,639,555 A | 6/1997 | Bishop |
| 5,660,884 A | 8/1997 | Crook et al. |
| 5,700,523 A | 12/1997 | Petrole et al. |
| 5,750,197 A | 5/1998 | van Ooij et al. |
| 5,759,629 A | 6/1998 | van Ooij et al. |
| 5,789,080 A | 8/1998 | Grimberg et al. |
| 5,907,015 A | 5/1999 | Sexsmith |
| 6,057,040 A | * 5/2000 | Hage |
| 6,162,547 A | * 12/2000 | van Ooji et al. |

FOREIGN PATENT DOCUMENTS

| | | |
|---|---|---|
| CA | 2110461 | 7/1994 |
| DE | 3443926 A1 | 6/1986 |
| EP | 0435781 A2 | 7/1991 |
| EP | 0533606 A1 | 3/1993 |
| EP | 0579253 B1 | 1/1994 |
| JP | 533076 | 2/1978 |
| JP | 5852036 | 11/1981 |
| JP | 56161475 | 12/1981 |
| JP | 6081256 | 5/1985 |
| JP | 60208480 | 10/1985 |
| JP | 60213902 | 10/1985 |
| JP | 627538 | 1/1987 |
| JP | 6257470 | 3/1987 |
| JP | 6397266 | 4/1988 |
| JP | 6397267 | 4/1988 |
| JP | 6334793 | 7/1988 |
| JP | 533275 | 5/1993 |
| JP | 6184792 | 7/1994 |
| WO | WO9830735 | 7/1998 |
| WO | WO9920682 | 4/1999 |
| WO | WO9920705 | 4/1999 |
| WO | WO003884-4 | 6/2000 |
| WO | WO-0039356 A1 * | 7/2000 |

OTHER PUBLICATIONS

Buchwalter, L.P., et al. Adhesion of polyimides to ceramics: Effects of aminopropyltriethoxysilane and temperature and humidity exposure on adhesion, *J. Adhesions Sci. Technol.*, vol. 5, No. 4, pp. 333–343 (1991).

(List continued on next page.)

*Primary Examiner*—Robert Dawson
*Assistant Examiner*—Kuo-Liang Peng
(74) *Attorney, Agent, or Firm*—Dinsmore & Shohl LLP

(57) ABSTRACT

A method of treating a metal substrate by applying a coating of a silane composition having at least one substantially unhydrolyzed aminosilane having one or more secondary or tertiary groups. Methods of adhering a polymer (such as rubber) to a metal substrate are also provided.

23 Claims, No Drawings

OTHER PUBLICATIONS

Cruse, R. W., Effect of Polysulfidic Silane Sulfur on Rolling Resistance, *Rubber & Plastic News*, pp. 14–17 (Apr. 21, 1997).

Henriksen, P.N., et al. Inelastic electron tunneling spectroscopic studies of alkoxysilanes adsorbed on alumina, *J. Adhesion Sci. Technol.*, vol. 5, No. 4, pp. 321–331 (1991).

Hornstrom, S.E., et al., Paint Adhesion and Corrosion of Performance of Chromium–Free Pretreatment of 55% Al–Zn–coated Steel, *J. Adhesion Sci. Technol.* vol. 10, No. 9, pps. 883–904 (1996).

Luginsland, H. D., Reactivity of the Sulfur Functions of the Disulfane Silane TESPD and the Tetrasulfane Silane TESPT, presented at a meeting of the Rubber Division, American Chemical Society, Chicago, Illinois (Apr. 13–16, 1999).

Plueddemann, Edwin P., Silane primers for epoxy adhesives, *J. Adhesion Sci. Technol.*, vol. 2, No. 3, pp. 179–188 (1988).

Plueddemann, Edwin P., Reminiscing on Silane Coupling Agents, *J. Adhesion Sci. Technol.* vol. 5, No. 4, pp. 261–277 (1991).

Plueddemann, Edwin P., et al. Adhesion Enhancing Additives for Silane Coupling Agents, 42nd Annual Conference, Composites Institute, The Society of the Plastics Industry, Inc., (Feb. 2–6, 1987).

Pu, Z., et al., Hydrolysis Kinetics and Stability of Bis (Triethoxysilyl) Ethane in Water–Ethanol Solution by FTIR Spectroscopy, *Journal of Adhesion Science and Technology* (1996).

Sabata, A., et al., Trends toward a better understanding of the interface in painted metals, *Trends in Corrosion Research*, 1, pp. 181–193 (1993).

Sabata, A., et al., The interphase in painted metals pretreated by functional silanes, *J. Adhesion Sci. Technol.*, vol. 7, No. 11, pp. 1153–1170 (1993).

Sabata, A. Et al., TOFSIMS Studies of Cleaning Procedures and Silane Surface Treatments of Steels, *Journal of Testing and Evaluation*, JTRVA, vol. 23, No. 2, pp. 119–125 (Mar. 1995).

van Ooij, W. J., et al. Characterization of Films of Organofunctional Silanes by ToF–SIMS, *Surface and Interface Analysis*, vol. 20, pp. 475–484 (1993).

van Ooij, W. J., et al. Modifications of the Interface Between Paints and Stainless Steels by Means of an Interphase Crosslinked Organofunctional, Materials Research Society Symposium Proceedings, vol. 304, pp. 155–160, (1993).

van Ooij, W. J., et al. Novel Silane–Based Pretreatments of Metals to Replace Chromate and Phosphate Treatment, 2nd Annual Advanced Tecniques for Replacing Chromium: An Information Exchange, prepared by David S. Viszlay, Concurrent Technologies Corp. NDCEE, Seven Springs Mountain Resort, Champion, PA (Nov. 7–8, 1995) pp. 287–310.

van Ooij, W. J., et al. On the Use, Characterization and Performance of Silane Coupling Agents Between Organic Coatings and Metallic or Ceramic Substrates, *American Institute of Physics*, pp. 305–321 (1996).

van Ooij, W. J., et al., Silane–Based Pretreatments of Al and its Alloys as Chromate Alternatives, Aluminium Surface Science Technology, "Elzenveld" Antwerp–Belgium, (May 12–15, 1997).

van Ooij, W. J. et al. Silane Coupling Agent Treatments of Metals for Corrosion Protection, Presented at the Fourth International Forum and business Development Conference on Surface Modification, Couplants and Adhesion Promoters, Adhesion Coupling Agent Technology 97, Boston, MA (Sep. 22–24, 1997).

van Ooij, W. J., et al., Pretreatment of Metals for Painting by Organofunctional Silanes, Extended Abstractof Paper Presented at 1997 International Symposium on Advances in Corrosion Protection by Organic Coatings, Noda, Japan (Oct. 29–31, 1997).

van Ooij, W. J., et al., Rubber to Metal Bonding, Presented at the International Conference on Rubbers, Calcutta, India (Dec. 12–14, 1997).

Walker, P., Organosilanes as adhesion promoters, *J. Adhesion Sci. Technol.* vol. 5, No. 4, pp. 279–305 (1991).

Wu, G. L. Et al. Alcoholysis of Chlorosilanes and the Synthesis of Silance Coupling Agents, Inst. Chem., Adad. Sin., Peking, People Rep. China, Hua Hsueh Hsueh Pao (1980) (Abstact Only).

Yuan, W., et al., Characterization of Organofunctional Silane Films on Zinc Substrates, Submitted to *Journal of Colloid and Interface Science*, (Aug. 30, 1996).

Zhang, B. C., et al., Charterization of Silane Films Deposited on Iron Surfaces, Submitted to Langmuir, First Revision, (May 3, 1996).

Abstract of Japanese patent No. 62–79732 (Oct. 4, 1994).

Abstract of Japanese patent No. 41–6174 (Apr. 8, 1992).

Abstract of Japanese patent No. 62–216727 (Sep. 24, 1987).

Abstract of Japanese patent No. 40–46932 (Feb. 17, 1992).

Comyn, J., et al., An examination of the interaction of silanes containing carbon–carbon double bonds with aluminum oxide by inelastic electron tunneling spectroscopy, *Int. J. Adhesion* (1990), 10(1), 13–18 (abstract only).

Kurth, D.G., et al., Monomolecular layers and thin films of silane coupling agents by vapor–p[hase adsorption on oxidized aluminum, *J. Phys. Chem* (1992), 96(16), 6707–12 (abstract only).

van Ooij, W. J., Silane–based Metal Pretreatments to Replace Phosphates and Chromates; copy of overhead slides presented at the 3rd Annual Advanced Techniques for Replacing Chromium: An Information Exchange and Technology Demonstration, Nov. 4–6, 1996.

Abstract of Japanese patent No. 59–185779 (Oct. 22, 1984).

Abstract of Japanese patent No. 07–329104 (Dec. 19, 1995).

Abstract of Japanese patent No. 62–83034 (Apr. 16, 1987).

Abstract of Japanese patent No. 53–232 (Jan. 5, 1978).

* cited by examiner

SILANE COATINGS FOR BONDING RUBBER TO METALS

BACKGROUND OF THE INVENTION

1. Field of the Invention

The present invention relates to silane coatings for metals. More particularly, the present invention provides silane coatings which not only provide improved adhesion to rubber and other polymers, but also provide corrosion protection (with or without a polymer layer).

2. Description of Related Art

Most metals are susceptible to corrosion, including the formation of various types of rust. Such corrosion will significantly affect the quality of such metals, as well as that of the products produced therefrom. Although rust and the like may often be removed, such steps are costly and may further diminish the strength of the metal. In addition, when polymer coatings such as paints, adhesives or rubbers are applied to the metals, corrosion may cause a loss of adhesion between the polymer coating and the metal.

By way of example, metallic coated steel sheet such as galvanized steel is used in many industries, including the automotive, construction and appliance industries. In most cases, the galvanized steel is painted or otherwise coated with a polymer layer to achieve a durable and aesthetically-pleasing product. Galvanized steel, particularly hot-dipped galvanized steel, however, often develops "white rust" during storage and shipment.

White rust (also called "wet-storage stain") is typically caused by moisture condensation on the surface of galvanized steel which reacts with the zinc coating. On products such as GALVALUME®, the wet-storage stain is black in color ("black rust"). White rust (as well as black rust) is aesthetically unappealing and impairs the ability of the galvanized steel to be painted or otherwise coated with a polymer. Thus, prior to such coating, the surface of the galvanized steel must be pretreated in order to remove the white rust and prevent its reformation beneath the polymer layer. Various methods are currently employed to not only prevent the formation of white rust during shipment and storage, but also to prevent the formation of white rust beneath a polymer coating (e.g., paint).

In order to prevent white, rust on hot-dipped galvanized steel during storage and shipping, the surface of the steel is often passivated by forming a thin chromate film on the surface of the steel. While such chromate coatings do provide resistance to the formation of white rust, chromium is highly toxic and environmentally undesirable. It is also known to employ a phosphate conversion coating in conjunction with a chromate rinse in order to improve paint adherence and provide corrosion protection. It is believed that the chromate rinse covers the pores in the phosphate coating, thereby improving the corrosion resistance and adhesion performance. Once again, however, it is highly desirable to eliminate the use of chromate altogether. Unfortunately, however, the phosphate conversion coating is generally not very effective without the chromate rinse.

Recently, various techniques for eliminating the use of chromate have been proposed. In particular, various silane coatings have been developed for preventing corrosion of metal substrates. For example, U.S. Pat. No. 5,108,793 describes a technique of coating certain metal substrates with an inorganic silicate followed by treating the silicate coating with an organofunctional silane (U.S. Pat. No. 5,108,793). U.S. Pat. No. 5,292,549 teaches the rinsing of metallic coated steel sheet with a solution containing an organic silane and a crosslinking agent. Other silane coatings are described in U.S. Pat. Nos. 5,750,197 and 5,759,629, both of which are incorporated herein by way of reference.

Often, the corrosion protection provided by a particular silane coating will depend upon the identity of the metal substrate itself. In addition, the silane coating must also be compatible with any polymer layer to be applied over the silane coating (such as paints, adhesives or rubbers). For example, while a particular silane coating may provide excellent paint adhesion and corrosion protection, that same silane coating may provide little or no adhesion to certain rubbers. Thus, it is often necessary to tailor the silane coating to the specific application.

The silane coatings (or films) known heretofore are typically applied from an aqueous solution wherein the silane(s) are at least partially hydrolyzed. The resulting silane films, however, often contain residual water that can only be driven out by a high temperature heat treatment. Although the films are usually somewhat crosslinked, higher degrees of crosslinking typically require high temperature heat treatment (e.g., 200° C.). These silane films are often very thin and fragile, and never completely pore-free or impervious to water. Therefore, corrosion may still occur to some extent when silane coated metals are exposed to a humid environment for a lengthy period of time. While high temperature heat treatment may help alleviate some of these problems, high temperature heat treatment may not always be practical. Thus, there is a need for a silane coating having improved mechanical properties and higher crosslink density, without the need for high temperature processing.

In addition to corrosion prevention, adhesive bonding between metals and rubber is also of interest. For example, many automobile components (such as tire cords and vibration dampers) rely on adhesive bonding between a metal substrate and a sulfur-cured rubber. Steel tire cords, for example, are typically coated with a thin layer of brass in order to promote adhesion between the underlying steel and the sulfur-cured rubber. In addition, adhesion promoters such as cobalt salt additives, and HRH systems (hexamethylene tetramine, resorcinol and hydrated silica) are also used to further enhance rubber adhesion for tire cords. Solvent-based adhesive systems are used in other applications for bonding metals to sulfur-cured rubbers. Although the performance of the various methods currently employed is adequate, they still suffer from several drawbacks. Cobalt salts, for example, are expensive and pose availability problems, while brass stimulates galvanic corrosion in conjunction with steel. Solvent-based adhesives are flammable and hence hazardous.

Although certain silanes have been found to promote adhesion between a metal substrate and a polymer layer, the results are typically system dependent. In other words, the amount of adhesion provided by a particular silane coating typically depends on the metal substrate as well as the polymer layer to be adhered thereto. For example, while certain silane solutions may provide improved adhesion between a metal substrate and a peroxide-cured rubber, these same silane solutions will often not provide the same results for sulfur-cured rubber. Thus, there is also a need for methods of improving the adhesion between a metal substrate and a polymer layer, particularly sulfur-cured rubber.

SUMMARY OF THE INVENTION

It is an object of the present invention to provide silane coatings on a metal substrates for improving corrosion resistance and/or polymer adhesion.

It is another object of the present invention to provide silane coatings which provide improved adhesion to rubber, including sulfur-cured and peroxide-cured rubber.

The foregoing objects, in accordance with one aspect of the present invention, are provided by a method of treating a metal substrate, comprising:

(a) providing a metal substrate; and
(b) applying a coating of a silane composition onto the metal substrate, the silane composition comprising at least one substantially unhydrolyzed aminosilane which has one or more secondary or tertiary amino groups.

Suitable aminosilanes include:

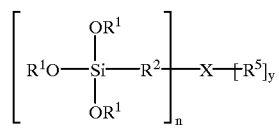

wherien:

n is either 1 or 2;
y=(2-n);
each $R^1$ is individually chosen from the group consisting of: $C_1$–$C_{24}$ alkyl and $C_2$–$C_{24}$ acyl;
each $R^2$ is individually chosen from the group consisting of: substituted aliphatic groups, unsubstituted aliphatic groups, substituted aromatic groups, and unsubstituted aromatic groups;
$R^5$ is chosen from the group consisting of: hydrogen, $C_1$–$C_{10}$ alkyl, $C_1$–$C_{10}$ alkyl substituted with one or more amino groups, $C_1$–$C_{10}$ alkenyl, $C_1$–$C_{10}$ alkenyl substituted with one or more amino groups, aryl, and alkylaryl;
X is either:

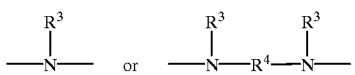

wherein each $R^3$ is individually chosen from the group consisting of: hydrogen, substituted and unsubstituted aliphatic groups, and substituted and unsubstituted aromatic groups; and
$R^4$ is chosen from the group consisting of: substituted and unsubstituted aliphatic groups, and substituted and unsubstituted aromatic groups; and wherein, when n=1, at least one of the $R^3$ and the $R^5$ is not hydrogen (else the aminosilane would contain no secondary or tertiary amino group).

Particularly preferred aminosilanes include bis-silyl aminosilanes having two trisubstituted silyl groups, wherein the substituents are individually chosen from the group consisting of alkoxy, aryloxy and acyloxy. Suitable bis-silyl aminosilanes include:

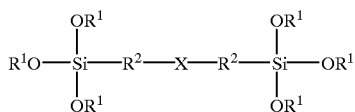

wherein:

each $R^1$ is individually chosen from the group consisting of: $C_1$–$C_{24}$ alkyl and $C_2$–$C_{24}$ acyl;

each $R^2$ is individually chosen from the group consisting of: substituted aliphatic groups, unsubstituted aliphatic groups, substituted aromatic groups, and unsubstituted aromatic groups; and X is either:

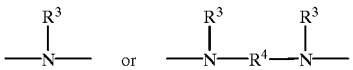

wherein each $R^3$ is individually chosen from the group consisting of: hydrogen, substituted and unsubstituted aliphatic groups, and substituted and unsubstituted aromatic groups; and
$R^4$ is chosen from the group consisting of: substituted and unsubstituted aliphatic groups, and substituted and unsubstituted aromatic groups.

Exemplary bis-silyl aminosilanes include: bis-(trimethoxysilylpropyl)amine, bis-(triethoxysilylpropyl) amine, bis-(triethoxysilylpropyl)ethylene diamine, N-[2-(vinylbenzylamino)ethyl]-3-aminopropyltrimethoxy silane, and aminoethyl-aminopropyltrimethoxy silane.

Although the coating provided by the unhydrolyzed aminosilane composition provides improved corrosion protection, the composition may further include at least one "other" substantially unhydrolyzed silane (i.e., an unhydrolyzed silane other than an aminosilane having at least one secondary or tertiary amino group). In particular, organofunctional silanes such as at least one substantially unhydrolyzed bis-silyl polysulfur silane, may be included in order to provide improved adhesion to a polymer (such as a paint, an adhesive, or a rubber, including sulfur-cured rubber). Suitable "other" silanes include bis-silyl polysulfur silanes comprising:

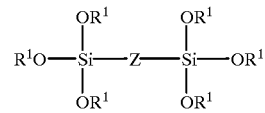

wherein each $R^1$ is an alkyl or an acetyl group, and Z is —Q—$S_x$—Q—, wherein each Q is an aliphatic or aromatic group, and x is an integer of from 2 to 10. An exemplary bis-silyl polysulfur silane is bis-(triethoxysilylpropyl) tetrasulfide.

In one preferred embodiment, one or more substantially unhydrolyzed bis-silyl aminosilanes are combined with one or more substantially unhydrolyzed bis-silyl polysulfur silanes to provide a silane composition which may be applied to a metal substrate. The resultant silane coating not only provides corrosion protection (even without a polymer coating thereover), but also provides surprisingly improved adhesion to polymers such as paints, adhesives, and rubbers. In particular, the silane coating provides improved adhesion to sulfur-cured rubbers, as well as peroxide-cured rubbers. Uncured (or even cured) rubber compounds are simply applied directly on the silane coating, and then cured in the usual fashion (or, if already cured, the rubber is simply heated while applying pressure). Sulfur-cured and peroxide-cured rubber compounds known to those skilled in the art may be adhered to metal substrates in this manner, using standard rubber curing methods also known to those skilled in the art.

The above mixture of one or more bis-silyl aminosilanes and one ore more bis-silyl polysulfur silanes may also be provided as a partially or substantially hydrolyzed silane solution. This hydrolyzed silane solution also provides surprising adhesion to polymers, particularly sulfur-cured and peroxide-cured rubbers.

DETAILED DESCRIPTION OF THE PREFERRED EMBODIMENTS

In U.S. Pat. No. 5,750,197, it was demonstrated that an aqueous solution of a hydrolyzed bis-functional silane (such as 1,2-bis-(trimethoxysilylpropyl) amine) provides corrosion protection. Applicants have now found that mixtures of at least one aminosilane and at least one bis-silyl polysulfur silane provide further improvements in both corrosion protection and polymer adhesion (particularly to sulfur-cured rubber). The silanes do not have to be hydrolyzed, as previously believed, since these silane mixtures provide corrosion protection and enhanced polymer adhesion whether hydrolyzed or unhydrolyzed. In addition, one or more unhydrolyzed aminosilanes may even be applied to a metal substrate alone (with or without the addition of other silanes), since applicants have found that silane coatings applied in this manner will form a dry film which provides corrosion protection. It is believed that secondary or tertiary amino groups in the aminosilane will crosslink, even if the aminosilane has not been hydrolyzed, thereby allowing the formation of a dry film from a one or more unhydrolyzed silanes.

The solutions and methods of the present invention may be used on a variety of metals, including (but not limited to):

zinc and zinc alloys, such as titanium-zinc (zinc which has a very small amount of titanium added thereto), zinc-nickel alloy (typically about 5% to about 13% nickel content), and zinc-cobalt alloy (typically about 1% cobalt);

metal substrates having a zinc-containing coating, such as galvanized steel (especially hot dipped galvanized steel ("HDG") and electrogalvanized steel ("EGS")), GAL-VALUME® (a 55%-Al/43.4%-Zn/1.6%-Si alloy coated sheet steel manufactured and sold, for example, by Bethlehem Steel Corp), GALFAN® (a 5%-Al/95%-Zn alloy coated sheet steel manufactured and sold by Weirton Steel Corp., of Weirton, W.V.), galvanneal (annealed hot dipped galvanized steel) and similar types of coated metals;

steel, particularly cold rolled steel and carbon steel;

aluminum and aluminum alloys;

copper and copper alloys, such as brass; and tin and tin alloys, including metal substrates (such as CRS) having tin-containing coatings The silane solutions and mixtures of the present invention may be applied to the metal prior to shipment to the end-user, and provide corrosion protection during shipment and storage. The coated metal may be used as is, or, more preferably the end user may apply a polymer layer (such as paint, rubber, or adhesive) directly on top of the silane coating in the usual manner. The silane coatings of the present invention not only provide excellent corrosion protection, but also provide superior adhesion between the metal substrate and the polymer layer. These silane coatings (or films) are also very durable and highly deformable, and therefore provide significant corrosion protection even after deep drawing of the coated metal. The methods and compositions of the present invention are particularly useful for bonding metals to rubber, including sulfur-cured rubber. In fact, the present invention provides improved adhesion between metals and sulfur-cured rubber without the need for cobalt adhesion promoters in the rubber composition.

The silane compositions of the present invention comprise one or more aminosilanes and one or more bis-silyl polysulfur silanes. The solutions do not require the use or addition of silicates or aluminates, and eliminate the need for phosphate conversion coatings. The silanes in the treatment solution may be substantially unhydrolyzed, partially hydrolyzed, or substantially fully hydrolyzed. As used herein, the term "substantially unhydrolyzed" simply means that the silane(s) are applied either in a pure state (no added solvents) or from a solution which does not include water. However, it is recognized that such silane(s) may absorb some water from the atmosphere, hence the term "substantially unhydrolyzed" (water is not purposefully added to the silane(s)).

The silane solutions of the present invention may also comprise one or more substantially unhydrolyzed aminosilanes having at least one secondary or tertiary amino group, with or without additional silanes or non-aqueous solvents. Applicants have found that these unhydrolyzed aminosilanes will dry to a hard film at room temperature (typically in 30 minutes or less. The silane coating applied from one or more unhydrolyzed aminosilanes will readily crosslink, and will even crosslink other silanes which are included in the coating. This finding is quite surprising, since conventional wisdom suggests that silanes should only be applied to metals in a hydrolyzed state (i.e., from a solution which includes water).

Hydrolyzed Silane Solutions

The hydrolyzed silane solutions of the present invention preferably comprise one or more bis-silyl aminosilanes and one or more bis-silyl polysulfur silanes. These hydrolyzed silane solutions also preferably include water (for hydrolysis), and one or more compatible solvents (such as ethanol, methanol, propanol or isopropanol) in order to solubilize the polysulfur silane. The amount of solvent employed will depend upon the concentration of polysulfur silane(s) in the solution, and the solution should therefore include sufficient solvent to solubilize the polysulfur silane (s). The ratio of water to solvent in the silane solution (as applied to the metal substrate, by volume) may be between about 1:99 and about 99:1, more preferably between about 1:1 and about 1:20.

It is preferred (but not required) that the two silanes (bis-silyl aminosilane and bis-silyl polysulfur silane) are hydrolyzed separately before being mixed with one another to form the silane solution which is applied to the metal substrate.

Thus, one or more bis-silyl aminosilanes may be hydrolyzed by mixing the silane(s) with water at the desired concentration. A compatible solvent (such as an alcohol) may be added as desired, however hydrolysis of the bis-silyl aminosilane will generally proceed to completion without an added solvent (and the resulting hydrolyzed silane solution will remain stable). One or more bis-silyl polysulfur silanes may be hydrolyzed in a similar fashion, however a compatible solvent should be included since these silanes are generally not water-soluble. Thus, hydrolysis of the bis-silyl polysulfur silane(s) may take place in a solution having a water to solvent ratio (by volume) of between about 1:99 and about 99:1, more preferably between about 1:1 and about 1:20.

As an alternative to employing an organic solvent, the hydrolyzed silanes (particularly the polysulfur silane(s)) may be prepared as an emulsion without a solvent. The silane(s) is simply mixed with water and a suitable surfactant known to those skilled in the art. An emulsified, hydrolyzed solution of a bis-silyl polysulfur silane can be prepared, for example, by mixing a 5% solution of the silane in water along with 0.2% of a surfactant (by volume). Suitable surfactants include, for example, sorbitan fatty acid esters (such as Span 20, available from ICI Surfactants). Once the emulsion of polysulfur silane has been prepared, it may simply be mixed with one or more hydrolyzed bis-silyl aminosilanes as described below and then applied to the metal substrate.

During hydrolysis, the —$OR^1$ groups in the bis-silyl aminosilane(s) and the bis-silyl polysulfur silane(s) (as defined below) are replaced by hydroxyl groups. In order to accelerate silane hydrolysis and avoid silane condensation during hydrolysis, the pH may be maintained below about 10, more preferably between about 4 and about 9 (particularly for hydrolysis of the bis-silyl aminosilane). The pH ranges preferred during solution preparation should not be confused with the application pH (i.e., the pH of the silane solution applied to the metal substrate). The pH may be adjusted, for example, by the addition of one or more compatible acids, preferably organic acids such as acetic, formic, propionic or iso-propionic. Sodium hydroxide (or other compatible base) may be used, if needed, to raise the pH of the silane solution. Some silanes provide an acidic pH when mixed with water alone, and for these silanes pH adjustment may not be needed to accelerate silane hydrolysis. The individual silane solutions are preferably stirred for at least 24 hours to ensure complete hydrolysis. In the case of the solution of bis-silyl polysulfur silane(s), hydrolysis may be allowed to proceed for several days (such as 3–4 days, or more) for optimal performance. Once the individual silane solutions have been separately hydrolyzed, they are mixed with one another prior to application on the metal substrate. The hydrolyzed silane mixtures, however, are stable for at least up to 30 days, and therefore need not be used immediately after mixing.

It should be noted that the various silane concentrations discussed and claimed herein are all defined in terms of the ratio between the amount (by volume) of unhydrolyzed silane(s) employed to prepare the treatment solution (i.e., prior to hydrolyzation), and the total volume of treatment solution components (i.e., aminosilanes, polysulfur silanes, water, optional solvents and optional pH adjusting agents). In the case of aminosilane(s), the concentrations herein (unless otherwise specified) refer to the total amount of unhydrolyzed aminosilanes employed, since multiple aminosilanes may optionally be present. The polysulfur silane(s) concentrations herein are defined in the same manner. During preparation of the individual hydrolyzed silane solutions, the silane concentration in each may vary significantly from the desired total silane concentration in the mixed silane solution (i.e., the solution which is applied to the metal substrate). It is preferred, however, that the silane concentration in the individual hydrolyzed solutions is approximately the same as the desired total silane concentration in the mixed silane solution in order to simplify the final mixing step. In this manner, the final mixed silane solution may be prepared simply by mixing the appropriate ratio of the individual silane solutions.

As for the concentration of hydrolyzed silanes in the final, mixed silane solution (i.e., the solution applied to the metal substrate) beneficial results will be obtained over a wide range of silane concentrations and ratios. It is preferred, however, that the hydrolyzed solution have at least about 0.1% silanes by volume, wherein this concentration refers to the total concentration of bis-silyl aminosilane(s) and bis-silyl polysulfur silane(s) in the solution. More preferably, the solution has between about 0.1% and about 10% silanes by volume. As for the ratio of bis-silyl aminosilane(s) to bis-silyl polysulfur silane(s) in the hydrolyzed silane solution, a wide range of silane ratios provide beneficial results. Preferably, however the ratio of bis-silyl aminosilane(s) to bis-silyl polysulfur silane(s) is between about 1:99 and about 99:1. More preferably, particularly when the hydrolyzed silane solution is to be used for rubber bonding, this ratio is between about 1:10 and about 10:1. Even more preferably, this ratio is between about 1:3 and about 3:1.

The term "application pH" refers to the pH of the silane solution when it is applied to the metal surface, and may be the same as, or different from the pH during solution preparation. When used to improve the adhesion of a rubber (particularly sulfur-cured rubber) to a metal, the application pH is preferably between about 4 and about 7, most preferably between about 4 and about 5. The pH of the mixed silane solution may be adjusted in the manner described previously.

The metal surface to be coated with the mixed hydrolyzed silane solution of the present invention may be solvent and/or alkaline cleaned by techniques well-known to those skilled in the art prior to application of the silane solution. The hydrolyzed silane solution (prepared in the manner described above) is applied to the metal surface (i.e., the sheet is coated with the silane solution) by, for example, dipping the metal into the solution (also referred to as rinsing), spraying the solution onto the surface of the metal, or even brushing or wiping the solution onto the metal surface. Various other application techniques well-known to those skilled in the art may also be used. When the preferred application method of dipping is employed, the duration of dipping is not critical, as it generally does not significantly affect the resulting film thickness. It is merely preferred that whatever application method is used, the contact time should be sufficient to ensure complete coating of the metal (such as 10 seconds or more).

After coating with the silane solution of the present invention, the metal substrate may simply be air-dried at room temperature. Heated drying is not preferred if the hydrolyzed silane coating is to be used for improving rubber adhesion, since it is preferred that the coating remain only partially crosslinked. While heated drying (or curing) promotes crosslinking, too much crosslinking in the silane coating may prevent sufficient adhesion between a rubber and the metal substrate. Of course the amount of crosslinking can be tailored to suit one's particular needs (such as the desired bond strength between the metal substrate and rubber), and the present invention is therefore not limited to silane coatings dried only at room temperature. Once dried, the treated metal may be shipped to an end-user, or even stored for later use.

The coatings applied from hydrolyzed silane solutions of the present invention provide significant corrosion resistance during both shipping and storage. More importantly, this silane coating need not be removed prior to application of a polymer layer on top of the silane coating. Thus, the end-user, such as an automotive manufacturer, may apply a polymer (such as a paint, an adhesive or rubber) directly on top of the silane coating without additional treatment (such as the application of chromates or the use of solvent-based adhesives). The hydrolyzed silane coatings of the present invention not only provide a surprisingly high degree of adhesion to the polymer layer, but also prevent delamination and underpaint corrosion even if a portion of the base metal is exposed to the atmosphere.

As reported in application Ser. No. 09/356,927, now abandoned, titled Silane Treatment for Electrocoated Metals, which names Wim J. van Ooij and Guru P. Sundararajan as inventors, was filed on even date herewith, and the disclosure of which is incorporated herein by way of reference, the hydrolyzed silane solutions of the present invention having both a bis-silyl aminosilane and a bis-silyl polysulfur silane also provide excellent adhesion to paints (particularly electrocoats) and other polymeric adhesives. As also reported therein, and as incorporated herein by way of reference, the hydrolyzed silane solutions of the present application also provide improved corrosion protection, as well as adhesion to other non-rubber polymers (such as paints and adhesives).

The hydrolyzed silane coatings of the present invention are particularly useful for bonding rubber to various metal substrates, particularly sulfur-cured rubbers such as natural rubber ("NR"), NBR, SBR and EPDM compounds. The uncured rubber compound is merely applied directly on top of the silane coating, and is then cured in the typical fashion (i.e., using the cure conditions required for the particular rubber compound employed). Even previously cured rubber may be adhered to the metals using the silane coatings of the present invention simply by applying the cured rubber compound directly on top of the silane coating and thereafter applying sufficient heat and pressure to adhere the rubber to silane coating (and hence to the metal substrate). Thus, the silane coatings provided by the hydrolyzed silane solutions of the present invention provide improved rubber adhesion, as well as significant corrosion protection. These results are surprising since a coating applied from a solution of a hydrolyzed bis-silyl aminosilane alone provides no adhesion to sulfur-cured rubber. Yet, when a solution comprising the same bis-silyl aminosilane and a hydrolyzed bis-silyl polysulfur silane is used, the resulting adhesion exceeds that provided by the bis-silyl polysulfur silane alone. Previously reported silane coatings which provide improved adhesion to peroxide-cured rubbers, likewise provide no adhesion to sulfur-cured rubbers. An added benefit of the improved adhesion provided by the hydrolyzed silane coatings of the present invention is that the sulfur-cured rubbers may be formulated without cobalt adhesion promoters, since the silane coatings of the present invention improve rubber adhesion without such promoters.

Since the hydrolyzed silane coatings of the present invention also provide corrosion protection and bonding to polymers other than rubber (such as paint), the present invention has the added benefit of providing silane solutions and methods which may be used in a myriad of applications. Thus, manufacturers need not use one silane solution for corrosion protection, another for paint adhesion, yet another for adhesion to peroxide-cured rubber, and still another for adhesion to sulfur-cured rubber. The hydrolyzed silane solutions of the present invention are suitable for all of these applications on a variety of metals.

The preferred bis-silyl aminosilanes which may be employed in the present invention have two trisubstituted silyl groups, wherein the substituents are individually chosen from the group consisting of alkoxy, aryloxy and acyloxy. Thus, these bis-silyl aminosilanes have the general structure:

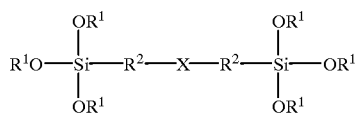

wherein each $R^1$ is chosen from the group consisting of: $C_1$–$C_{24}$ alkyl (preferably $C_1$–$C_6$ alkyl), and $C_2$–$C_{24}$ acyl (preferably $C_2$–$C_4$ acyl). Each $R^1$ may be the same or different, however, in the hydrolyzed silane solutions of the present invention, at least a portion (and preferably all or substantially all) of the $R^1$ groups are replaced by a hydrogen atom. Preferably, each $R^1$ is individually chosen from the group consisting of: ethyl, methyl, propyl, iso-propyl, butyl, iso-butyl, sec-butyl, ter-butyl and acetyl.

Each $R^2$ in the aminosilane(s) may be a substituted or unsubstituted aliphatic group, or a substituted or unsubstituted aromatic group, and each $R^2$ may be the same or different. Preferably, each $R^2$ is chosen from the group consisting of: $C_1$–$C_{10}$ alkylene, $C_1$–$C_{10}$ alkenylene, arylene, and alkylarylene. More preferably, each $R^2$ is a $C_1$–$C_{10}$ alkylene (particularly propylene).

X may be:

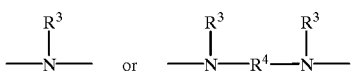

wherein each $R^3$ may be a hydrogen, a substituted or unsubstituted aliphatic group, or a substituted or unsubstituted aromatic group, and each $R^3$ may be the same or different. Preferably, each $R^3$ is chosen from the group consisting of hydrogen, $C_1$–$C_6$ alkyl and $C_1$–$C_6$ alkenyl. More preferably, each $R^3$ is a hydrogen atom.

Finally, $R^4$ in the aminosilane(s) may be a substituted or unsubstituted aliphatic group, or a substituted or unsubstituted aromatic group. Preferably, $R^4$ is chosen from the group consisting of: $C_1$–$C_{10}$ alkylene, $C_1$–$C_{10}$ alkenylene, arylene, and alkylarylene. More preferably, $R^4$ is a $C_1$–$C_{10}$ alkylene (particularly ethylene).

Exemplary preferred bis-silyl aminosilanes which may be used in the present invention include:

bis-(trimethoxysilylpropyl)amine (which is sold under the tradename A-1170 by Witco):

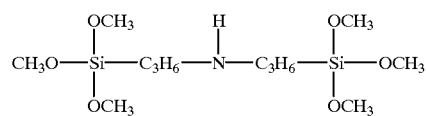

bis-(triethoxysilylpropyl)amine:

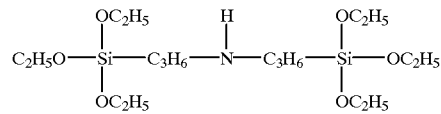

and bis-(triethoxysilylpropyl)ethylene diamine:

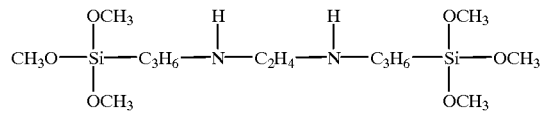

The preferred bis-silyl polysulfur silanes which may be employed in the present invention include:

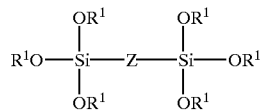

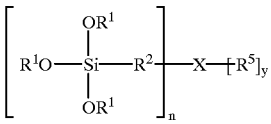

wherein each $R^1$ is as described before. In the hydrolyzed silane solutions of the present invention, at least a portion (and preferably all or substantially all) of the $R^1$ groups are replaced by a hydrogen atom. Z is —Q—$S_x$—Q—, wherein each Q is an aliphatic (saturated or unsaturated) or aromatic group, and x is an integer of from 2 to 10. Q within the bis-functional polysulfur silane can be the same or different. In a preferred embodiment, each Q is individually chosen from the group consisting of: $C_1$–$C_6$ alkyl (linear or branched), $C_1$–$C_6$ alkenyl (linear or branched), $C_1$–$C_6$ alkyl substituted with one or more amino groups, $C_1$–$C_6$ alkenyl substituted with one or more amino groups, benzyl, and benzyl substituted with $C_1$–$C_6$ alkyl.

Particularly preferred bis-silyl polysulfur silanes include bis-(triethoxysilylpropyl) sulfides having 2 to 10 sulfur atoms. Such compounds have the following formula:

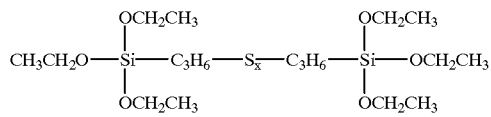

wherein x is an integer of from 2 to 10. One particularly preferred compound is bis-(triethoxysilylpropyl) tetrasulfide (also referred to as bis-(triethoxysilylpropyl) sulfane, or "TESPT"). Commercially-available forms of TESPT (such as A-1289, available from Witco), however, are actually mixtures of bis-(triethoxysilylpropyl) sulfides having 2 to 10 sulfur atoms. In other words, these commercially-available forms of TESPT have a distribution of sulfide chain lengths, with the $S_3$ and $S_4$ sulfides predominating. Thus, the scope of the present invention includes hydrolyzed silane solutions containing mixtures of bis-silyl polysulfur silanes in combination with one or more bis-silyl aminosilanes.

Coatings Applied from Unhydrolyzed Silanes

Applicants have also surprisingly found that unhydrolyzed silanes may be applied directly onto the metal substrate in order to not only provide corrosion protection, but also to provide improved adhesion to polymer layers (such as paints, adhesives, or rubbers). Preferably, at least one aminosilane having at least one secondary or tertiary amino group (such as the bis-silyl aminosilanes described above) is applied to the metal substrate in a substantially unhydrolyzed state (i.e., the $R^1$ groups are not replaced by a hydrogen atom). One or more additional silanes (organofunctional or non-organofunctional) may also be mixed with the aminosilane, however even an unhydrolyzed aminosilane by itself provides corrosion protection.

The aminosilanes which may be applied to a metal substrate in an unhydrolyzed state include aminosilanes having at least one secondary or tertiary amino group. Suitable unhydrolyzed aminosilanes include:

wherein n is either 1 or 2. Thus, when a bis-silyl aminosilane of the type described previously is employed, n=2. Each $R^1$ is as defined previously, each $R^2$ is as described previously, and X is as described previously. $R^5$ may be hydrogen, $C_1$–$C_{10}$ alkyl, $C_1$–$C_{10}$ alkyl substituted with one or more amino groups, $C_1$–$C_{10}$ alkenyl, $C_1$–$C_{10}$ alkenyl substituted with one or more amino groups, aryl, and alkylaryl. When n=1, $R^3$ and $R^5$ should not all be hydrogen (else the aminosilane will have no secondary or tertiary aminosilane groups). Particularly preferred aminosilanes include the bis-silyl aminosilanes (i.e., n=2, y=0) described previously, as well as diamino silanes. Suitable diaminosilanes include those silanes having at least one trialkoxysilyl or triacetoxysilyl group, as well as two amino groups, at least one of which is a secondary amino group. Suitable diamino silanes include N-[2-(vinylbenzylamino)ethyl]-3-aminopropyltrimethoxy ("SAAPS"), aminoethyl-aminopropyltrimethoxy silane ("AEPS"), and bis-(triethoxysilylpropyl)ethylene diamine (a bis-silyl, diamino silane).

The unhydrolyzed secondary or tertiary aminosilane(s) may also be combined with one or more additional unhydrolyzed silanes, particularly organofunctional silanes, prior to application to the metal substrate. In this fashion, one can tailor the silane coating to the particular application. While one or more unhydrolyzed secondary or tertiary aminosilane (s) will provide a durable, corrosion-preventing film, applicants have found that the addition of one or more other unhydrolyzed silanes (particularly organofunctional silanes, such as bis-silyl polysulfur silanes), will not only provide corrosion resistance but also polymer adhesion. "Organofunctional silane" simply means a silane having one or more trisubstituted silyl groups, and one or more organofunctional groups.

One preferred embodiment of the present invention comprises a mixture of one or more aminosilanes having at least one secondary or tertiary amino group (especially the bis-silyl aminosilanes described previously) and one or more bis-silyl polysulfur silanes (as described above), with the silanes in a substantially unhydrolyzed state. The silane(s) (whether an aminosilane by itself, or a mixture of one or more aminosilanes and one or more other silanes) may be applied to the metal substrate as a pure silane mixture (i.e., no solvents or water), or may be diluted with a compatible solvent (other than water). Suitable solvents, for example, include, ethanol, methanol, propanol and isopropanol. Diluting the unhydrolyzed silane(s) with a compatible solvent allows the thickness of the silane to be controlled.

The unhydrolyzed silane(s) are simply coated onto the metal substrate, such as by wiping, dipping or spraying the silane (or silane mixture) onto the metal. Thereafter, the silane coating is dried. If the unhydrolyzed silane mixture applied to the metal substrate contains only aminosilanes, the coating is preferably dried at room temperature. Alternatively, the aminosilane coating may be dried by heating to a temperature of between about 100° and about 25° for a period of time sufficient to form a dry film (i.e., silane coating).

When the unhydrolyzed silane mixture applied to the metal substrate includes both an aminosilane (such as a bis-silyl aminosilane) and an organofunctional silane (such as a bis-silyl polysulfur silane), the silane coating is preferably dried by heating the coated metal to a temperature of between about 100° C. and about 250° C. (more preferably to a temperature of between about 100° C. and about 160° C., for a period of time sufficient to form a dry film (such as about 10 to about 60 minutes). It should be noted, however, that the amount of drying time will obviously vary with the drying temperature, as well as the nature of the silane coating (e.g., silane concentrations, amount of organic solvent, etc.). Thus, longer periods of time than that specified may be used. As the coating dries, the unhydrolyzed silanes will become partially crosslinked, thereby forming a semi-crosslinked silane coating which not only provides significant corrosion protection, but also improved adhesion to polymers such as paints, adhesives and rubbers (particularly sulfur-cured rubbers). When the unhydrolyzed silane coating is used for polymer adhesion (particularly to sulfur-cured rubber), the silane coated metal should merely be dried for a period of time sufficient to form a dry film (i.e., so that the silane film is semi-crosslinked). When the silane film is intended to provide corrosion protection only, the silane film may be fully crosslinked (or cured) simply by heating the silane coated metal substrate for a longer period of time and/or at a higher temperature. While a fully crosslinked silane film is not desired for polymer adhesion, it will provide significant corrosion protection.

The unhydrolyzed silane mixtures of the present invention are prepared simply by mixing the silanes with one another in their pure, unhydrolyzed state in the desired ratio. The resulting silane mixture may be diluted with a compatible solvent, if desired. If a solvent is used, the total silane concentration should be at least about 10% (by volume), more preferably at least about 25%.

As for the ratio of unhydrolyzed aminosilane(s) having at least one secondary or tertiary amino group (such as unhydrolyzed bis-silyl aminosilane(s)) to other unhydrolyzed silane(s) (such as unhydrolyzed bis-silyl polysulfur silane (s)), a wide range of silane ratios provide beneficial results. Preferably, however, the ratio of aminosilane(s) to other silanes is between about 1:10 and about 10:1. More preferably, particularly when the unhydrolyzed silane mixture is to be used for rubber bonding, this ratio is between about 1:3 and about 1:1.

Applicants have found that unhydrolyzed silane compositions-having at least one secondary or tertiary aminosilane (particularly at least one bis-silyl aminosilane) provide a silane coating which is highly resistant to corrosion. When the silane compositions include one or more organofunctional silanes (particularly at least one bis-silyl polysulfur silane), the resultant silane coating provides superior adhesion to polymers (such as paints, adhesives and rubbers). In fact, the adhesion to sulfur-cured rubbers is even greater than that provided by the hydrolyzed silane solutions of the present invention. Like the hydrolyzed silane solutions discussed previously, the unhydrolyzed silane compositions of the present invention provide unexpectedly high levels of adhesion to a variety of rubber compositions, including sulfur-cured rubber such as high-sulfur rubber systems, low-sulfur rubber systems, EV rubber systems, and semi-EV rubber systems.

The coatings provided by the unhydrolyzed silane compositions of the present invention are also highly stable. Therefore, a polymer layer may be applied long after the silane coating is established on the metal substrate, and the silane coated metal (without a polymer layer) may be exposed to the environment without significant deleterious effect. Thus, silane coatings provided by the unhydrolyzed silane compositions of the present invention provide a high level of corrosion protection even without a polymer layer thereon, and will still provide improved polymer adhesion even after a lengthy exposure to the environment.

EXAMPLES

Hydrolyzed Silane Solutions

The examples below demonstrate some of the superior and unexpected results obtained by employing the methods of the present invention. Unless otherwise noted, the various silane solutions described in the following examples were prepared by mixing the indicated silane(s) with water, solvent (ethanol), and acetic acid (if needed to provide the indicated pH during solution preparation). In instances wherein both a bis-silyl aminosilane and a bis-silyl polysulfur silane were employed, the silanes were hydrolyzed separately in a solution of water and solvent, and the hydrolyzed silane solutions were then mixed to form the final silane solution composition indicated. The individual silane solutions were hydrolyzed for at least 24 hours prior to application. The metal substrates were solvent-cleaned, alkaline-cleaned, water rinsed, dried, dipped into the silane solution for approximately 1 minute, and then dried at room temperature.

In most of the rubber bonding tests which follow, three types of sulfur-cured rubber formulations were used: (1) a typical tire-cord skim compound having a cobalt adhesion promoter; (2) a typical tire-cord skim compound without cobalt adhesion promoter; and (3) a low-sulfur compound used, for example, in engine mount applications. The formulations employed are set forth below (in parts by weight).

Rubber Formulations

| | Compound 1 | Compound 2 | Compound 3 |
| --- | --- | --- | --- |
| NatSyn rubber | 100.0 | 100.0 | — |
| Natural rubber (SMR-5) | — | — | 100.0 |
| Zinc Oxide | 10.0 | 10.0 | 3.0 |
| Stearic acid | 1.2 | 1.2 | 2.0 |
| Carbon black | 60.0 (N326) | 60.0 (N326) | 50.0 (N330) |
| Santoflex 13 | 1.0 | 1.0 | 2.0 |
| Sundex 790 | — | — | 10.0 |
| Cobalt naphthenate 10% | 2.0 | — | — |
| Vulkacit DZ | 0.5 | 0.5 | — |
| PVI | 0.2 | 0.2 | — |
| Insoluble sulfur (20% oil) | 7.0 | 7.0 | — |
| Microcrystalline wax | — | — | 2.0 |
| CBS | — | — | 1.4 |
| Sulfur | — | — | 2.5 |

Example 1

The following table provides adhesion results using hydrolyzed silane solutions on cold rolled steel ("CRS"). For each of the silane solutions, the indicated concentration (by volume) of the silane was mixed with alcohol (methanol or ethanol) and an amount of water equivalent to the silane concentration. For example, a 5% A1170 solution was prepared by mixing 5% A1170, 5% water and 90% ethanol (by volume). The pH was adjusted to the indicated amount by adding acetic acid as needed. The silane solution was stirred for at least 24 hours in order to complete hydrolysis. For mixtures of A1170 and A1289, the silanes were separately hydrolyzed in the same manner (5% silane, 5% water and 90% alcohol). After at least 24 hours of hydrolysis, the two silane solutions were mixed together to provide the indicated ratio of A1170:A1289, with the total silane concentration in the mixed silane solutions being 5% in all cases.

CRS panels were ultrasonically cleaned in acetone, hexane and methanol. The panels were then alkaline cleaned in the usual manner, rinsed in deionized water, and blow-dried with hot air. The panels were then dipped into the silane solution for 30–45 seconds, and-thereafter dried.

In order to evaluate the adhesion to rubber provided by the silane coatings, a layer of the specified uncured rubber composition was sandwiched between two silane coated panels. One half of each metal panel was shielded from the rubber by a Mylar film in order to prevent bonding in that region. The composite article was then cured in a hydraulic press at 160° C. (8 minutes for Rubber Compound 1, 11 minutes for Rubber Compound 2, and 5 minutes for Rubber Compound 3). After curing, adhesion strength was measured by pulling portion of each metal panel not bonded to the cured rubber (because of the Mylar film) away from the rubber in opposite directions using an Instron Tensile Tester (Instron 4465) at a jaw speed of 2.54 cm/min. The force required to separate the composite is shown in the table, along with the failure mode. A "100% interface" failure mode means that the metal peeled away from the rubber, while "cohesive failure" means that the rubber itself failed before the metal to rubber bond.

| Silane, Conc. | pH | Rubber compound | Instron | Failure mode |
|---|---|---|---|---|
| None | — | Compound 2 | ON | 100% Interface |
| VS, 5% | 4.0 | Compound 2 | ON | 100% Interface |
| BTSE, 5% | 4.0 | Compound 2 | ON | 100% Interface |
| 2% BTSE, 5% VS** | 4.0 | Compound 2 | ON | 100% Interface |
| A1170, 5% | 4.0 | Compound 2 | ON | 100% Interface |
| A1289, 2% | 7.9 | Compound 2 | 122 ± 43 N | 100% Interface |
| A1289, 2% | 2.9 | Compound 2 | 160 ± 150 N | 100% Interface |
| A1289, 2% | 5.0 | Compound 2 | 115 ± 50 N | 100% Interface |
| A1289, 1% | 6.5 | Compound 2 | 120 ± 79 N | 100% Interface |
| A1289, 0.5% | 6.0 | Compound 2 | 174 ± 15 N | 100% Interface |
| A1289, 5% | 4.0 | Compound 2 | 350 ± 20 N | 100% Interface |
| A1170:A1289 = 3:1 | 6.9 | Compound 2 | 233 ± 20 N | 100% Interface |
| A1170:A1289 = 3:1 | 4.4 | Compound 2 | 161 ± 88 N | 100% Interface |
| A1170:A1289 = 1:1 | 6.95 | Compound 2 | 262 ± 13 N | 100% Interface |
| A1170:A1289 = 1:1 | 4.5 | Compound 2 | 272 ± 18 N | 100% Interface |
| A1170:A1289 = 1:3 | 7.1 | Compound 2 | 264 ± 57 N | 100% Interface |
| A1170:A1289 = 1:3 | 4.4 | Compound 2 | 692 ± 50 N | >80% Cohesive |
| A1170:A1289 = 1:3 | 4.4 | Compound 2 | 220 ± 78 N | 50% Cohesive |
| A1170:A1289 = 1:3* | 4.2 | Compound 2 | 238 ± 31 N | 100% Interface |
| A1170:A1289 = 1:9 | 4.4 | Compound 2 | 438 ± 57 N | 50% Cohesive |
| A1170:A1289 = 1:9 | 4.4 | Compound 2 | 179 ± 18 N | 100% Interface |
| A1170:A1289 = 1:4 | 4.2 | Compound 2 | 327 ± 16 N | 50% Cohesive |
| A1170:A1289 = 1:19 | 4.38 | Compound 2 | 184 ± 10 N | 100% Interface |
| A1289, 2% | 6.5 | Compound 1 | 212 ± 30 N | 100% Interface |
| A1289, 5% | 6.5 | Compound 1 | 267 ± 30 N | 100% Interface |
| A1170:A1289 = 1:3 | 4.25 | Compound 1 | 215 ± 11 N | 100% Interface |
| A1170:A1289 = 1:3 | 4.4 | Compound 3 | 271 ± 7 N | 100% Interface |
| A1170:A1289 = 1:9 | 4.4 | Compound 3 | 246 ± 17 N | 100% Interface |
| A1170:A1289 = 1:19 | 4.2 | Compound 3 | 257 ± 60 N | 100% Interface |

*A-1170 solution was one week old
**two-step treatment method
VS = vinyltrimethoxysilane
BTSE = 1,2-bis-(triethoxysilyl)ethane
A-1170 = bis-(trimethoxysilylpropyl) amine
A-1289 = bis-(triethoxysilylpropyl) tetrasulfide The wide discrepancies in the data reported above are due, in part, to the nature of the method of measuring adhesion. For example, many of the samples bent during testing, thereby calling into question the accuracy of adhesion force measurements for such samples. Therefore, the mode of failure provides a more accurate representation of rubber adhesion.

As indicated by the above results, mixtures of hydrolyzed A1170 and A1289 provided adhesion which was surprisingly superior to that provided by either silane alone. In fact, a hydrolyzed solution of A1170 provided no adhesion at all, yet even a small addition of A1170 to a hydrolyzed solution of A1289 improves adhesion. Other hydrolyzed silane solutions provided no adhesion to the sulfur-cured rubber, including the two-step BTSE/VS treatment which has previously been shown to provide excellent adhesion to peroxide-cured rubbers. The above results also indicate that the hydrolyzed silane mixtures of the present invention allow for the elimination of cobalt adhesion promoters, since the silane mixtures of the present invention provide better adhesion when the cobalt adhesion promoter is not used.

Example 2

Panels of electrogalvanized steel ("EGS") were tested in the same manner as in Example 1, and the results are provided below.

| Silane, Conc. | pH | Rubber compound | Instron | Failure mode |
|---|---|---|---|---|
| A1170 5% | 8.5 | Compound 2 | ON | 100% Interface |
| A1289 5% | 6.5 | Compound 2 | 120 ± 30 N | 100% Interface |
| A1170:A1289 = 3:1 | 6.9 | Compound 2 | 121 ± 61 N | 100% Interface |
| A1170:A1289 = 1:1 | 6.9 | Compound 2 | 91 ± 13 N | 100% Interface |
| A1170:A1289 = 1:3 | 7.1 | Compound 2 | 72 ± 35 N | 100% Interface |

As noted from the above table, the addition of hydrolyzed A1170 to hydrolyzed A1289 solution does not significantly affect adhesion performance, even though hydrolyzed A1170 by itself provides no adhesion. However, the addition of A1170 during the period of time will provide greater corrosion protection, particularly during metal shipment or storage between application of the silane coating and rubber bonding.

Example 3

Panels of tin-coated CRS were tested in the same manner as in Example 1, and the results are provided below.

| Silane, Conc. | pH | Rubber compound | Instron | Failure mode |
|---|---|---|---|---|
| A1170:A1289 = 1:3 | 4.25 | Compound 1 | 227 ± 18 N | 100% Interface |
| A1170:A1289 = 1:9 | 4.4 | Compound 1 | 173 ± 44 N | 100% Interface |
| A1170:A1289 = 1:19 | 4.38 | Compound 1 | 164 ± 4 N | 100% Interface |

Unhydrolyzed Silanes

In the next set of examples, unhydrolyzed silane compositions were employed. Unless otherwise noted, all of the silane coatings were applied from pure silanes (either pure A1170, or a mixture consisting only of A1170 and A1289 in the indicated ratio). After the silanes were mixed with one another, the resultant silane mixture was wiped onto the metal (which had been cleaned in the manner described previously) using a paper towel. Unless otherwise noted, the silane coating applied in this manner was then dried for one hour at 150° C. Thereafter, the rubber composition was bonded to the silane coated metal in the manner described previously.

Example 4

Panels of 63/37 brass were coated with unhydrolyzed silanes, and rubber adhesion was tested in the same manner as in Example 1:

| Silane, Conc. | Rubber compound | Instron | Failure mode |
|---|---|---|---|
| Blank | Compound 1 | 800 ± 50 N | 100% Cohesive |
| A1170:A1289 = 1:3 | Compound 1 | 685 ± 81 N | 75% Cohesive |
| Blank | Compound 2 | 450 ± 30 N | 60% Cohesive |
| A1170:A1289 = 1:3 | Compound 2 | 926 ± 71 N | 90% Cohesive |
| Blank | Compound 3 | 380 ± 33 N | 100% interface |
| A1170:A1289 = 1:3 | Compound 3 | 679 ± 49 N | 70% Cohesive |

Although sulfur-cured rubber having a cobalt adhesion promoter adheres well to uncoated 63/37 brass, the unhydrolyzed A1170/A1289 mixture provided excellent adhesion to all three rubber formulations (with or without the cobalt adhesion promoter). Thus, the silane mixtures of the present invention allows for the elimination of the cobalt adhesion promoter, while also providing improved corrosion protection.

Example 5

Panels of Alloy 360 brass and Alloy 260 brass were coated with unhydrolyzed silanes, and adhered to a rubber composition in the same manner as in Example 4. Rubber adhesion was then tested in accordance with ASTM D429(B), and the results are provided below.

| Metal | Silane, Conc. | Rubber compound | Adhesion |
|---|---|---|---|
| Alloy 360 brass | Blank | Compound 1 | 0 N/mm |
| | Blank | Compound 2 | 0 N/mm |
| | A1170:A1289 = 1:3 | Compound 2 | 10.46 ± 1.6 N/mm |
| Alloy 260 brass | Blank | Compound 1 | 12.13 ± 3.0 N/mm |
| | Blank | Compound 2 | 10.23 ± 3.6 N/mm |
| | A1170:A1289 = 1:3 | Compound 2 | 11.14 ± 1.4 N/mm |

As the above table indicates, the unhydrolyzed silane mixtures of the present invention provide excellent rubber adhesion on a variety of brass alloys, including Alloy 360 brass (which will not adhere to sulfur-cured rubber).

Example 6

Panels of CRS were coated with unhydrolyzed silanes, and rubber adhesion was tested in the same manner as in Example 4:

| Silane, Conc. | Rubber compound | Instron | Failure mode |
|---|---|---|---|
| Blank | Compound 2 | ON | 100% Interface |
| A1170:A1289 = 1:3* | Compound 2 | 325 ± 36 N | 10% Cohesive |
| A1170:A1289 = 1:3** | Compound 2 | 752 ± 124 N | 2 samples ≈ 80% cohesive failure, 1 sample ≈ 50% cohesive failure |
| A1170:A1289 = 1:3** | Compound 2 | 476 ± 296 N | 1 sample ≈ 80% cohesive failure, 2 samples ≈ 30% cohesive failure |
| A1170:A1289 = 1:1* | Compound 2 | 284 ± 34 N | 10% Cohesive |
| A1170:A1289 = 1:1** | Compound 2 | 398 ± 163 N | 20% cohesive failure |
| A1170:A1289 = 1:1** | Compound 2 | 261 ± 39 N | 10% cohesive failure |
| Blank | Compound 3 | ON | 100% Interface |
| A1170:A1289 = 1:3** | Compound 3 | 209 ± 29 N | 100% Interface |

*silane mixture had aged for 2 days
**silane mixture had aged for one week

Once again the large discrepancies in the adhesion values noted in the above table are due, in part, to the nature of the test employed. Therefore, the mode of failure is considered by the Applicants to be more significant. The above results demonstrate that unhydrolyzed mixtures of A1170 and A1289 provide even greater rubber adhesion than the hydrolyzed silane solutions of the present invention. This is surprising since conventional wisdom teaches that silanes should be applied to metals in a hydrolyzed state, rather than substantially unhydrolyzed. In addition, applicants have found that while unhydrolyzed A1289 alone will not form a dry film, when combined with unhydrolyzed A1170 it provides a superior, crosslinked silane coating. This highly crosslinked silane coating not only provides improved adhesion to rubbers and other polymers (such as paint), it also provides excellent corrosion protection (even without a polymer layer on top of the silane coating).

Example 7

Panels of EGS were coated with unhydrolyzed silanes, and rubber adhesion was tested in the same manner as in Example 4:

| Silane, Conc. | Rubber compound | Instron | Failure mode |
|---|---|---|---|
| Blank | Compound 2 | ON | 100% Interface |
| A1170:A1289 = 1:3* | Compound 2 | 567 ± 200 N | 2 samples ≈ 80% cohesive failure, 1 sample ≈ 30% cohesive failure |
| A1170:A1289 = 1:3** | Compound 2 | 629 ± 132 N | 1 sample >80% cohesive failure, 2 samples ≈ 40% cohesive failure |
| A1170:A1289 = 1:3** | Compound 2 | 422 ± 73 N | 20% cohesive failure |
| A1170:A1289 = 1:1* | Compound 2 | 640 ± 70 N | 85–90% Cohesive |
| A1170:A1289 = 1:1** | Compound 2 | 606 ± 124 N | ≈40–50% cohesive failure |
| A1170:A1289 = 1:1** | Compound 2 | 433 ± 245 N | 1 sample ≈ 80% cohesive failure, 2 samples ≈ 20% cohesive failure |
| Blank | Compound 3 | ON | 100% Interface |
| A1170:A1289 = 1:3** | Compound 3 | 534 ± 157 N | 2 sample ≈ 60% cohesive failure, 1 sample ≈ 40% cohesive failure |
| A1170:A1289 = 1:1** | Compound 3 | 391 ± 135 N | 30% cohesive failure |

*silane mixture had aged for 2 days
**silane mixture had aged for one week

Example 8

Panels of NedZinc (a zinc-titanium alloy) were coated with unhydrolyzed silanes, and rubber adhesion was tested in the same manner as in Example 4:

| Silane, Conc. | Rubber compound | Instron | Failure mode |
|---|---|---|---|
| A1170:A1289 = 1:3* | Compound 2 | 434 ± 131 N | 50% cohesive failure |

*silane mixture had aged for 2 days

Example 9

In order to evaluate the stability of aluminum to rubber bonding using unhydrolyzed silanes, panels of aluminum were coated with unhydrolyzed silanes. SBR, NBR and EPDM rubber compositions were used in this test, and the rubber formulations were as follows:

| | SBR | NBR |
|---|---|---|
| SBR 1500 | 100.0 | — |
| NBR | — | 100.0 |
| Zinc Oxide | 5.0 | 5.0 |
| Stearic acid | 2.0 | 2.0 |
| Processing Aid | 4.0 | — |
| DOP | — | 10.0 |
| Carbon black | 50.0 (N330) | 30.0 (N770) 70.0 (N550) |
| MBTS | 1.0 | — |
| TMTD | 0.5 | 2.0 |
| Sulfur | 2.0 | 1.5 |
| CBS | — | 1.0 |

| | EPDM 1 | EPDM 2 |
|---|---|---|
| Vistalon 2504 | 100.0 | — |
| Vistalon 5630/5300 | — | 50.0/50.0 |
| Zinc Oxide | 5.0 | 5.0 |
| Stearic acid | 1.0 | 1.0 |
| Aromatic Oil | 35.0 | — |
| Naphthenic Oil | — | 60.0 |
| Carbon black | 60.0 (N990) 70.0 (N550) | 75.0 (N990) 75.0 (N550) |
| TMTD | 0.6 | 2.0 |
| MBTS | 1.0 | — |
| CBS | — | 2.0 |
| ZDBC | 2.0 | — |
| DTDM | — | 2.0 |
| Sulfur | 2.0 | 0.3 |

The cured rubber compositions were applied to silane coated panels, and then cured by standard curing conditions. Rubber adhesion was tested according to ISO 813 (equivalent to ASTM D429B), and was reported qualitatively. The panels were tested immediately after curing, and after the specified exposure time in water at 100° C.

| Silane, Conc. | Rubber compound | Exposure Time in Water, 100° C. | | | | |
|---|---|---|---|---|---|---|
| | | Initial | 24 hr | 48 hr | 72 hr | 168 hr |
| A1170:A1289 = 1:3 | EPDM 1 | 3.8 | 3.5 | 3.5 | 3.5 | 3.5 |
| A1170:A1289 = 1:3 | EPDM 2 | 3.5 | 3.4 | 3.4 | 3.4 | 3.0 |
| A1170:A1289 = 1:3 | SBR | 4 | 4 | 3.8 | 3.8 | 3.8 |
| A1170:A1289 = 1:3 | NBR | 4 | 4 | 4 | 4 | 4 |

4 = ≧95% rubber (i.e., cohesive) failure
3 = high strength, partial rupture, >10% rubber failure
2 = medium strength peel - interfacial rupture
1 = low strength peel
0 = no bond

Example 10

Various other metals were adhered to rubber in the same manner as Example 9, using a mixture of unhydrolyzed A1170 and unhydrolyzed A1289 (1:3 ratio). Rubber adhesion was evaluated according to ISO 813, and the adhesion results are reported below (in N/mm).

| Metal | Rubber compound | Exposure Time in Water, 100° C. | | | |
|---|---|---|---|---|---|
| | | Initial | 72 hrs | 168 hrs | 336 hrs |
| 304 Stainless Steel | EPDM 1 | 6.1 N/mm 8.0 | 7.1 | 6.1 8.5 | 8.1 |
| 1010 Carbon Steel | EPDM 1 | 8.3 6.3 | 6.0 | 7.4 5.1 | 4.9 |
| Aluminum | EPDM 1 | 5.3 | 5.9 | 6.1 | |
| 70/30 Brass | EPDM 1 | 7.9 | 6.5 | 6.8 | |
| 304 Stainless Steel | NBR | 12.9 | 9.9 | 11.4 | |
| 1010 Carbon Steel | NBR | 14.6 | 10.4 | 15.3 | |
| Aluminum | NBR | 8.6 | 7.8 | 10.4 | |
| 70/30 Brass | NBR | 15.1 | 9.4 | 8.7 | |
| 304 Stainless Steel | EPDM 3 | 8.9 | 8.5 | 5.6 | |
| 1010 Carbon Steel | NBR 2 | 20.6 | 10.3 | 9.4 | |

"EPDM 3" and "NBR 2" were standard peroxide-cured EPDM and NBR rubbers, respectively.

Example 11

In order to examine the effect of silane aging, low carbon steel (SAE C-1018) was bonded to rubber in the same manner as in Example 10 (unhydrolyzed silanes, A1170:A1289=1:3). Rubber adhesion was also tested in accordance with ASTM D429B.

| Age of Silane Mixture | Peel Strength, N/mm | Mode of Failure |
| --- | --- | --- |
| Fresh | 11.7 ± 1.5 | 100% cohesive |
| Aged 2.5 weeks | 11.2 ± 1.3 | 100% cohesive |
| Aged 8 weeks | 13.0 ± 0.8 | 100% cohesive |

Example 12

In order to examine the effect of silane concentration in the unhydrolyzed systems of the present invention, CRS was bonded to rubber in the same manner as in Example 10 (unhydrolyzed silanes, A1170:A1289=1:3). Rubber adhesion was also tested in the same manner as in Example 11.

| Silane, Conc. | Rubber compound | Adhesion Strength | Failure mode |
| --- | --- | --- | --- |
| 100% Silanes (A1170:A1289 = 1:3) | Compound 2 | 11.7 ± 1.5 N/mm | 100% Cohesive |
| 50% Silanes in Ethanol | Compound 2 | 9.5 ± 1.7 N/mm | 100% Cohesive |
| 25% Silanes in Ethanol | Compound 2 | 10.4 ± 4.4 N/mm | 90% Cohesive |
| 100% Silanes (A1170:A1289 = 1:3) | Compound 3 | 10.2 ± 2.3 N/mm | 80% Cohesive |

As noted above, the unhydrolyzed silane mixtures of the present invention may be applied as pure silanes (i.e., no solvents), or with significant quantities of non-aqueous solvents (such as ethanol or methanol).

Comparison of Corrosion Protection Provided by Hydrolyzed and Unhydrolyzed Silanes

Example 13

In order to examine the corrosion protection provided by the hydrolyzed and unhydrolyzed silane compositions of the present invention, silane coatings were applied to pure aluminum panels. The hydrolyzed silane solutions were prepared and applied in the manner described in Example 1, and the unhydrolyzed silanes were prepared and applied as described in Example 4. The silane coated panels were then placed into a 3% NaCl solution for 192 hours. Corrosion was evaluated qualitatively, and the results are shown below.

| Silane Solution | pH | Curing Conditions | Surface Observation |
| --- | --- | --- | --- |
| Blank | N/A | — | large size pits, distributed uniformly |
| A1170, hydrolyzed, 5% solution | 8 | dried at room temperature | small pits, distributed uniformly |
| A1289, hydrolyzed, 5% solution | 8 | dried at room temperature | almost original appearance |
| 5% A1170 + 5% A1289, hydrolyzed | 8 | dried at room temperature | almost original appearance |
| pure A1170, unhydrolyzed | N/A | 160° C. for 30 minutes | original appearance |
| 1:1 mixture of A1170 and A1289, unhydrolyzed (no solvent) | N/A | 160° C. for 30 minutes | almost original appearance |

As shown in the above table, the mixture of hydrolyzed A1170 and A1289 provided excellent corrosion protection (superior to hydrolyzed A1170 alone, and at least equivalent to hydrolyzed A1289 alone). The unhydrolyzed silanes (including pure A1170, as well as the A1170/A1289 mixture) also provided excellent corrosion prevention. Thus, the silane solutions and methods of the present invention not only provide superior polymer adhesion, but also provide corrosion protection (with or without a polymer layer over the silane coating).

The corrosion protection provided by the methods of the present invention on CRS and EGS was also measured quantitatively by conducting standard electrochemical polarization tests. The results of these tests are shown below, wherein the rate of corrosion is reported in millimeters per year.

| Silane Solution | pH | Curing Conditions | Corrosion Rate (mpy) |
| --- | --- | --- | --- |
| CRS | | | |
| Blank | N/A | — | 143.4 |
| A1170, hydrolyzed, 2% solution | 8 | 100° C. for 10 minutes | 36.6 |
| A1289, hydrolyzed, 5% solution | 4.5–5 | 100° C. for 10 minutes | 5.7 |
| pure A1170, unhydrolyzed | N/A | dried at room temp. | 5.6 |
| 1:3 mixture of A1170 and A1289, unhydrolyzed (no solvent) | N/A | 160° C. for 40 minutes | 2.4 |
| EGS | | | |
| A1170, hydrolyzed, 2% solution | 8 | 100° C. for 10 minutes | 30.7 |
| A1289, hydrolyzed, 5% solution | 4.5–5 | 100° C. for 10 minutes | 0.78 |
| pure A1170, unhydrolyzed | N/A | dried at room temp. | 3.7 |
| 1:3 mixture of A1170 and A1289, unhydrolyzed (no solvent) | N/A | 160° C. for 40 minutes | 1.5 |

What we claim is:

1. A method of treating a metal substrate, comprising:

(a) providing a metal substrate; and (b) applying a coating of a silane composition onto the metal substrate, said silane composition consisting essentially of at least one substantially unhydrolyzed aminosilane which has one or more secondary or tertiary amino groups.

2. The method of claim 1, wherein said aminosilane comprises:

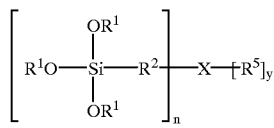

wherein:
n is either 1 or 2;
y=(2-n);
each $R^1$ is individually chosen from the group consisting of: $C_1$–$C_{24}$ alkyl and $C_2$–$C_{24}$ acyl;
each $R^2$ is individually chosen from the group consisting of: substituted aliphatic groups, unsubstituted aliphatic groups, substituted aromatic groups, and unsubstituted aromatic groups;
$R^5$ is chosen from the group consisting of: hydrogen, $C_1$–$C_{10}$ alkyl, $C_1$–$C_{10}$ alkyl substituted with one or more amino groups, $C_1$–$C_{10}$ alkenyl, $C_1$–$C_{10}$ alkenyl substituted with one or more amino groups, aryl, and alkylaryl;
X is either:

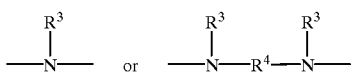

wherein each $R^3$ is individually chosen from the group consisting of: hydrogen, substituted and unsubstituted aliphatic groups, and substituted and unsubstituted aromatic groups; and
$R^4$ is chosen from the group consisting of: substituted and unsubstituted aliphatic groups, and substituted and unsubstituted aromatic groups; and
wherein, when n=1, at least one of said $R^3$ and said $R^5$ is not hydrogen.

3. A method of treating a metal substrate, comprising:
(a) providing a metal substrate; and
(b) applying a coating of a silane composition onto the metal substrate, said silane composition comprising at least one substantially unhydrolyzed aminosilane which has one or more secondary or tertiary amino groups, wherein said aminosilane comprises a bis-silyl aminosilane having two trisubstituted silyl groups, wherein the substituents are individually chosen from the group consisting of alkoxy, aryloxy and acyloxy.

4. The method of claim 3, wherein said bis-silyl aminosilane comprises:

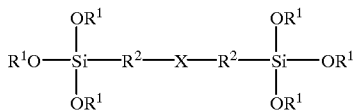

wherein:
each $R^1$ is individually chosen from the group consisting of: $C_1$–$C_{24}$ alkyl and $C_2$–$C_{24}$ acyl;
each $R^2$ is individually chosen from the group consisting of: substituted aliphatic groups, unsubstituted aliphatic groups, substituted aromatic groups, and unsubstituted aromatic groups; and X is either:

wherein each $R^3$ is individually chosen from the group consisting of: hydrogen, substituted and unsubstituted aliphatic groups, and substituted and unsubstituted aromatic groups; and
$R^4$ is chosen from the group consisting of: substituted and unsubstituted aliphatic groups, and substituted and unsubstituted aromatic groups.

5. The method of claim 4, wherein each $R^1$ is individually chosen from the group consisting of: ethyl, methyl, propyl, iso-propyl, butyl, iso-butyl, sec-butyl, ter-butyl and acetyl.

6. The method of claim 4, wherein $R^2$ is individually chosen from the group consisting of: $C_1$–$C_{10}$ alkylene, $C_1$–$C_{10}$ alkenylene, arylene, and alkylarylene.

7. The method of claim 4, wherein $R^4$ is chosen from the group consisting of: $C_1$–$C_{10}$ alkylene, $C_1$–$C_{10}$ alkenylene, arylene, and alkylarylene.

8. The method of claim 1, wherein said aminosilane is chosen from the group consisting of: bis-(trimethoxysilylpropyl)amine, bis-(triethoxysilylpropyl)amine, bis-(triethoxysilylpropyl)ethylene diamine, N-[2-(vinylbenzylamino)ethyl]-3-aminopropyltrimethoxy silane, and aminoethyl-aminopropyltrimethoxy silane.

9. A method of treating a metal substrate, comprising:
(a) providing a metal substrate; and
(b) applying a coating of a silane composition onto the metal substrate, said silane composition comprising at least one substantially unhydrolyzed aminosilane which has one or more secondary or tertiary amino groups, wherein said silane composition further comprises at least one additional substantially unhydrolyzed silane.

10. The method of claim 3, wherein said silane composition further comprises at least one substantially unhydrolyzed bis-silyl polysulfur silane.

11. The method of claim 10, wherein said bis-silyl polysulfur silane comprises:

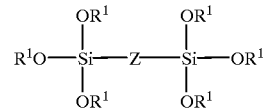

wherein each $R^1$ is an alkyl or an acetyl group, and Z is —Q—$S_x$—Q—, wherein each Q is an aliphatic or aromatic group, and x is an integer of from 2 to 10.

12. The method of claim 11, wherein each $R^1$ is individually chosen from the group consisting of: ethyl, methyl, propyl, iso-propyl, butyl, iso-butyl, sec-butyl, ter-butyl and acetyl.

13. The method of claim 11, wherein each Q is individually chosen from the group consisting of: $C_1$–$C_6$ alkyl (linear or branched), $C_1$–$C_6$ alkenyl (linear or branched), $C_1$–$C_6$ alkyl substituted with one or more amino groups; $C_1$–$C_6$ alkenyl substituted with one or more amino groups, benzyl, and benzyl substituted with $C_1$–$C_6$ alkyl.

14. The method of claim 10, wherein said at least one bis-silyl polysulfur silane comprises a bis-(triethoxysilylpropyl) polysulfide having 2 to 10 sulfur atoms.

15. The method of claim 10, wherein said at least one bis-silyl polysulfur silane comprises bis-(triethoxysilylpropyl) tetrasulfide.

16. The method of claim 10, wherein the ratio of bis-silyl aminosilanes to bis-silyl polysulfur silanes in said silane composition is between about 1:10 and about 10:1.

17. The method of claim 10, wherein the ratio of bis-silyl aminosilanes to bis-silyl polysulfur silanes in said silane composition is between about 1:3 and about 1:1.

18. The method of claim 10, wherein said silane composition further comprises a non-aqueous solvent.

19. The method of claim 18, wherein said solvent is chosen from the group consisting of: ethanol, methanol, propanol and isopropanol.

20. The method of claim 1, wherein said silane composition consists essentially of at least one substantially unhydrolyzed bis-silyl aminosilane and at least one substantially unhydrolyzed bis-silyl polysulfur silane.

21. The method of claim 20, wherein said silane composition consists essentially of said at least one substantially unhydrolyzed bis-silyl aminosilane, said at least one substantially unhydrolyzed bis-silyl polysulfur silane, and a non-aqueous solvent.

22. The method of claim 10, further comprising the step of drying said coating.

23. A silane coated metal substrate made in accordance with the method of claim 1.

* * * * *